(12) United States Patent
Takahashi

(10) Patent No.: US 12,337,558 B2
(45) Date of Patent: Jun. 24, 2025

(54) SEALANT MATERIAL COMPOSITION

(71) Applicant: THE YOKOHAMA RUBBER CO., LTD., Tokyo (JP)

(72) Inventor: Kiyohito Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 378 days.

(21) Appl. No.: 17/403,036

(22) Filed: Aug. 16, 2021

(65) Prior Publication Data

US 2021/0394469 A1    Dec. 23, 2021

(30) Foreign Application Priority Data

Jun. 19, 2020 (JP) ................. 2020-106040
Jun. 19, 2020 (JP) ................. 2020-106049

(51) Int. Cl.
| | |
|---|---|
| B29C 73/22 | (2006.01) |
| B60C 1/00 | (2006.01) |
| B60C 19/12 | (2006.01) |
| C08K 3/06 | (2006.01) |
| C08K 5/14 | (2006.01) |
| C08L 23/22 | (2025.01) |
| C08L 23/283 | (2025.01) |
| C08L 91/00 | (2006.01) |

(52) U.S. Cl.
CPC ............. *B29C 73/22* (2013.01); *C08K 3/06* (2013.01); *C08K 5/14* (2013.01); *C08L 23/22* (2013.01); *C08L 23/283* (2013.01); *C08L 91/00* (2013.01); *B60C 1/0008* (2013.01); *B60C 19/12* (2013.01)

(58) Field of Classification Search
CPC ......... B60C 1/00; B60C 1/0008; B60C 19/12; B29C 73/22; C08L 23/22; C08L 23/283
See application file for complete search history.

(56) References Cited

U.S. PATENT DOCUMENTS

| | | | | |
|---|---|---|---|---|
| 4,539,344 A | * | 9/1985 | Van Ornum | B60C 19/12 152/508 |
| 8,614,276 B2 | * | 12/2013 | Voge | B60C 19/122 524/484 |
| 2006/0194898 A1 | * | 8/2006 | Sanda | B29C 73/22 523/166 |
| 2018/0201774 A1 | * | 7/2018 | Sugimoto | C08L 23/24 |
| 2018/0215903 A1 | * | 8/2018 | Kohl | C09J 4/00 |
| 2023/0020308 A1 | | 1/2023 | Takahashi | |

FOREIGN PATENT DOCUMENTS

| | | | |
|---|---|---|---|
| IE | 42487 B1 | * | 8/1980 |
| JP | S57-42753 A | | 3/1982 |
| JP | 2006-152110 A | | 6/2006 |
| JP | 2018-075897 A | | 5/2018 |
| WO | 2019/181415 A1 | | 9/2019 |
| WO | 2021/125275 A1 | | 6/2021 |

* cited by examiner

*Primary Examiner* — John M Cooney
*Assistant Examiner* — Jeffrey S Lenihan
(74) *Attorney, Agent, or Firm* — Carrier, Shende & Associates P.C.; Fulchand P. Shende; Joseph P. Carrier

(57) ABSTRACT

Provided is a sealant material composition that can ensure good sealing properties while suppressing a flow of a sealant during travel and that can provide such performance in a well-balanced, compatible manner. As a sealant material composition constituting a sealant layer (10) disposed in an inner surface of a pneumatic tire, a sealant material composition in which a proportion (A) of toluene insoluble occupying the sealant material composition is from 30 mass % to 60 mass % is used, or a sealant material composition in which a ratio (d1/d2) of measured specific gravity (d1) of the sealant material composition measured by an underwater replacement method to calculated specific gravity (d2) of the sealant material composition calculated from specific gravity and a blended amount of each raw material in the sealant material composition is from 0.7 to 0.9 is used.

8 Claims, 1 Drawing Sheet

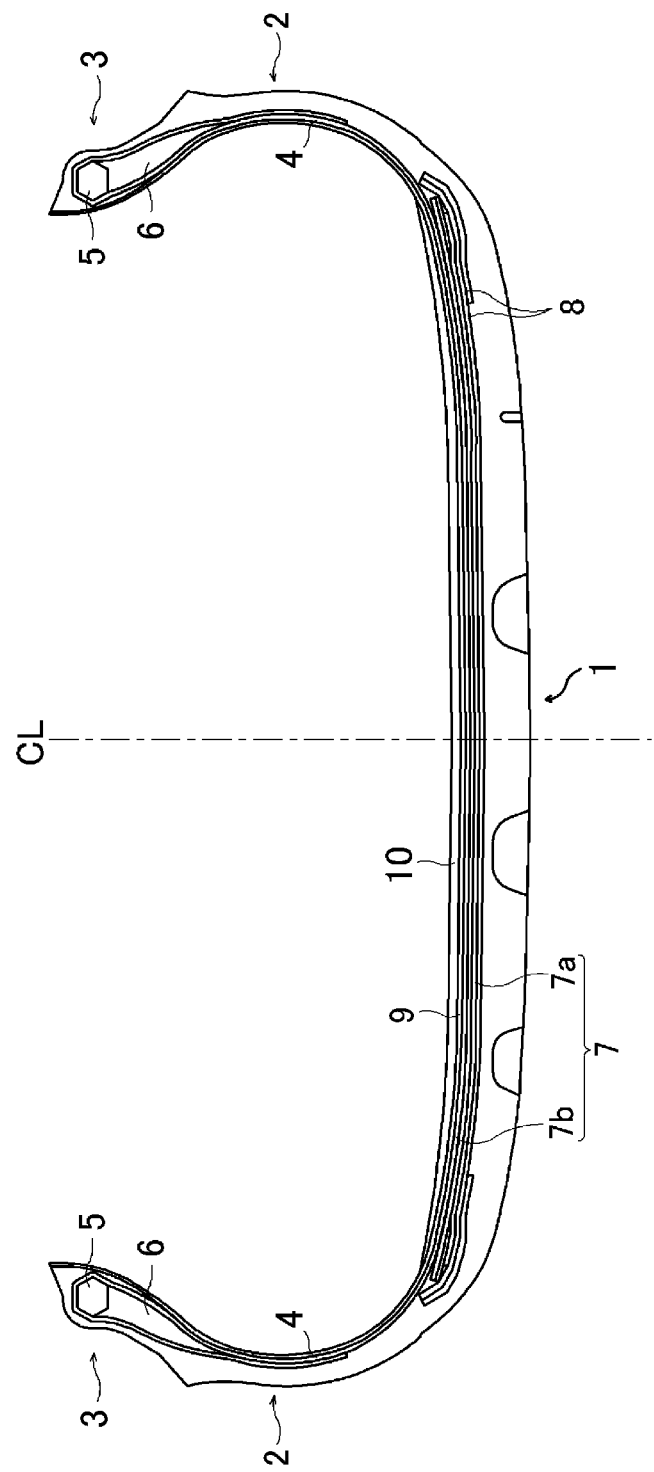

SEALANT MATERIAL COMPOSITION

TECHNICAL FIELD

The present invention relates to a sealant material composition constituting a sealant layer of a self-sealing type pneumatic tire including the sealant layer in a tire inner surface.

BACKGROUND ART

In a known pneumatic tire, a sealant layer is provided in an inner side in a tire radial direction of an innerliner layer in a tread portion (for example, see Patent Document 1). In such a pneumatic tire, when a foreign matter such as a nail sticks into the tread portion, a sealant material constituting the sealant layer flows into a through-hole made by the foreign matter, and accordingly, a decrease in air pressure can be suppressed and travel can be maintained.

In the self-sealing type pneumatic tire described above, when the viscosity of the sealant material is lower, since the sealant material easily flows into the through-hole, improvement of sealing properties can be expected, but in a case where the sealant material flows toward a tire center side due to the effects of heat and centrifugal force applied during travel, and as a result, the through-hole deviates from a tire center region, there is concern that the sealant material becomes insufficient and sealing properties cannot be obtained sufficiently. On the other hand, when the viscosity of the sealant material is high, a flow of the sealant material described above can be prevented, but the sealant material becomes difficult to flow into the through-hole, and there is concern that the sealing properties decrease. Thus, there is a demand that a sealant material composition constituting a sealant material provides suppression of a flow of a sealant material associated with travel and ensuring of good sealing properties in a well-balanced, compatible manner.

CITATION LIST

Patent Literature

Patent Document 1: JP 2006-152110 A

SUMMARY OF INVENTION

Technical Problem

An object of the present invention is to provide a sealant material composition that can ensure good sealing properties while suppressing a flow of a sealant during travel and that can provide such performance in a well-balanced, compatible manner.

Solution to Problem

A sealant material composition of an embodiment of the present invention to achieve the object described above is a sealant material composition constituting a sealant layer disposed in an inner surface of a pneumatic tire, characterized in that a proportion A of toluene insoluble occupying the sealant material composition represented by Formula (1) below is from 30 mass % to 60 mass %:

$$A = (W2/W1) \times 100 \qquad (1)$$

(where W2 is mass (unit: g) of toluene insoluble remaining after immersion of the sealant material composition in toluene for one week, and W1 is initial mass (unit: g) obtained before immersion of the sealant material composition in toluene).

Advantageous Effects of Invention

Since a sealant material composition of an embodiment of the present invention has the characteristics described above, the sealant material composition can ensure good sealing properties while suppressing a flow of a sealant during travel and can provide such performance in a well-balanced, compatible manner. Specifically, a proportion A of toluene insoluble is in the range described above, and accordingly, adequate crosslinking density can be achieved, and suitable physical properties (low fluidity and excellent sealing properties) as a sealant material can be ensured.

In an embodiment of the present invention, the proportion A of the toluene insoluble occupying the sealant material composition is preferably from 35 mass % to 50 mass %. The proportion A of the toluene insoluble is set in this manner, and accordingly, the physical properties of the sealant material composition become better, and even under special conditions such as high speeds and low temperatures, suppression of a flow of the sealant and ensuring of good sealing properties can be provided in a compatible manner.

In the sealant material composition of an embodiment of the present invention, assuming that specific gravity of the sealant material composition measured by an underwater replacement method is measured specific gravity d1, and specific gravity of the sealant material composition calculated from specific gravity and a blended amount of each raw material in the sealant material composition is calculated specific gravity d2, a ratio d1/d2 of the measured specific gravity d1 to the calculated specific gravity d2 is preferably from 0.7 to 0.9. Such a relationship of the specific gravity is satisfied, and accordingly, this is advantageous in that good sealing properties are ensured while suppressing a flow of the sealant during travel and such performance is provided in a well-balanced, compatible manner. That is, measured specific gravity d1 smaller than calculated specific gravity d2 means that cavities such as air bubbles are formed inside the sealant material (sealant layer) and the ratio d1/d2 is in the range described above, and accordingly, adequate cavities are formed, and thus, good sealing properties and good fluidity can be ensured without loss of sealing properties and fluidity. In addition, in a case where the sealant layer is provided in the tire inner surface, accumulation of heat is easily generated, or a load is added by the sealant layer and the total weight of the tire becomes heavy, and thus, there is concern that the sealant layer affects the durability (high-speed durability and load durability) of the tire. However, since the relationship of the specific gravity described above is satisfied and adequate cavities are formed, accumulation of heat due to the sealant layer can be suppressed, and as compared to a sealant material including no cavity, even when the sealant layer having an identical volume is provided, a weight increase can be suppressed, and thus, good durability (high-speed durability and load durability) of the tire can be ensured. Note that in an embodiment of the present invention, measured specific gravity d1 is a value measured by the underwater replacement method in accordance with JIS Z8807 "Methods of measuring density and specific gravity of solid."

At this time, the calculated specific gravity d2 is preferably 1.0 or less. Accordingly, the calculated specific gravity d2 (and the measured specific gravity d1) becomes sufficiently small, and thus, this is advantageous in that durability (particularly high-speed durability) improves.

In an embodiment of the present invention, from 0.1 parts by mass to 40 parts by mass of a crosslinking agent is preferably blended per 100 parts by mass of a rubber component. Crosslinking is performed by using an adequate content of the crosslinking agent in this manner, and accordingly, this is advantageous in that adequate elasticity that does not cause a flow during travel is obtained while ensuring viscosity sufficient to obtain good sealing properties, and such performance is provided in a well-balanced, compatible manner.

In an embodiment of the present invention, the crosslinking agent preferably includes a sulfur component. Accordingly, reactivity of the rubber component (for example, butyl rubber) and the crosslinking agent increases, and the processability of the sealant material composition can improve.

In an embodiment of the present invention, the rubber component preferably includes butyl rubber, and a blended amount of the butyl rubber per 100 mass % of the rubber component is preferably 10 mass % or more. Further, the butyl rubber preferably includes chlorinated butyl rubber, and a blended amount of the chlorinated butyl rubber per 100 mass % of the rubber component is preferably 5 mass % or more. According to such a blend, adhesiveness with respect to the tire inner surface can improve.

In an embodiment of the present invention, from 1 part by mass to 40 parts by mass of an organic peroxide and more than 0 parts by mass and less than 1 part by mass of a crosslinking aid are preferably blended per 100 parts by mass of the rubber component. Crosslinking is performed by using the organic peroxide and the crosslinking aid in combination in this manner, and accordingly, this is advantageous in that adequate elasticity that does not cause a flow during travel or storage is obtained while ensuring viscosity sufficient to obtain good sealing properties, and such performance is provided in a well-balanced, compatible manner. Additionally, particularly, an adequate content of air bubbles (cavities) is formed by including the content described above of the organic peroxide, and accordingly, this is advantageous in that the ratio d1/d2 described above is set to be in the appropriate range, and durability improves.

In an embodiment of the present invention, from 50 parts by mass to 400 parts by mass of a liquid polymer is preferably blended per 100 parts by mass of the rubber component. Additionally, the liquid polymer is preferably paraffin oil. Further, in a case where the liquid polymer is paraffin oil, molecular weight of the paraffin oil is preferably 800 or more. Accordingly, the temperature dependency of the physical properties of the sealant material composition can be reduced, and this is advantageous in that good sealing properties in low-temperature environments is ensured.

In a pneumatic tire including the sealant layer including the sealant material composition described above of an embodiment of the present invention, due to excellent physical properties of the sealant material composition described above, good sealing properties can be exhibited while suppressing a flow of the sealant associated with travel, and such performance can be provided in a well-balanced, compatible manner.

BRIEF DESCRIPTION OF DRAWINGS

Drawing FIGURE is a meridian cross-sectional view illustrating an example of a pneumatic tire of an embodiment of the present invention.

DESCRIPTION OF EMBODIMENTS

Configurations of embodiments of the present invention will be described in detail below with reference to the accompanying drawings.

As illustrated in drawing FIGURE for example, a pneumatic tire (self-sealing type pneumatic tire) of an embodiment of the present invention includes a tread portion 1 extending in a tire circumferential direction and having an annular shape, a pair of sidewall portions 2 disposed on both sides of the tread portion 1, and a pair of bead portions 3 disposed on an inner side in a tire radial direction of the sidewall portions 2. In drawing FIGURE, reference sign "CL" denotes a tire equator. Note that drawing figure is a meridian cross-sectional view, and although not illustrated, the tread portion 1, the sidewall portions 2, and the bead portions 3 each extend in the tire circumferential direction and each have an annular shape, and accordingly, a basic structure of a toroidal shape of the pneumatic tire is constituted. Additionally, unless otherwise indicated, other tire components in the meridian cross-sectional view also each extend in the tire circumferential direction and each have an annular shape.

In the example of drawing FIGURE, a carcass layer 4 is mounted between the pair of bead portions 3 of left and right. The carcass layer 4 includes a plurality of reinforcing cords extending in the tire radial direction, and is folded back around a bead core 5 and a bead filler 6 disposed in each of the bead portions 3 from a vehicle inner side to a vehicle outer side. Additionally, the bead filler 6 is disposed on an outer circumferential side of the bead core 5, and the bead filler 6 is enveloped by a body portion and a folded back portion of the carcass layer 4.

A plurality of belt layers 7 (two layers in drawing FIGURE) are embedded on an outer circumferential side of the carcass layer 4 in the tread portion 1. Among the plurality of belt layers 7, a layer having the smallest belt width is referred to as a minimum belt layer 7a, and a layer having the largest belt width is referred to as a maximum belt layer 7b. Each of the belt layers 7 includes a plurality of reinforcing cords inclined with respect to the tire circumferential direction, and is disposed such that the reinforcing cords intersect one another between the layers. In the belt layers 7, an inclination angle of the reinforcing cords with respect to the tire circumferential direction is set to be in the range of, for example, from 10° to 40°. A belt reinforcing layer 8 is provided on an outer circumferential side of the belt layers 7 in the tread portion 1. In the illustrated example, the belt reinforcing layer 8 is provided including two layers of a full cover layer covering the entire width of the belt layer 7 and an edge cover layer disposed further on an outer circumferential side than the full cover layer and covering only an end portion of the belt layer 7. The belt reinforcing layer 8 includes an organic fiber cord oriented in the tire circumferential direction, and an angle of the organic fiber cord with respect to the tire circumferential direction is set to be, for example, from 0° to 5°.

In a tire inner surface, an innerliner layer 9 is provided along the carcass layer 4. Innerliner layer 9 is a layer for preventing air in the tire from permeate outside the tire. The innerliner layer 9 includes, for example, a rubber composition including, as a main component, butyl rubber having air permeation preventing performance. Alternatively, the innerliner 9 can also include a resin layer including a thermoplastic resin as a matrix. In the case of the resin layer, a resin layer including an elastomer component dispersed in a matrix of a thermoplastic resin may be used.

As illustrated in drawing FIGURE, a sealant layer 10 is provided on an inner side in the tire radial direction of the innerliner layer 9 in the tread portion 1. Particularly, the sealant layer 10 is provided in the tire inner surface corresponding to a region into which a foreign matter such as a nail may stick during travel, that is, a ground contact region of the tread portion 1. Particularly, the sealant layer 10 may be provided in the range wider than the width of the minimum belt layer 7a. A sealant material composition of an embodiment of the present invention is used in the sealant layer 10. Sealant layer 10 is a layer attached to the inner surface of the pneumatic tire including the basic structure described above, and for example, when a foreign matter such as a nail sticks into the tread portion 1, a sealant material constituting the sealant layer 10 flows into a through-hole made by the foreign matter and seals the through-hole, and accordingly, a decrease in air pressure can be suppressed and travel can be maintained.

The sealant layer 10 has a thickness of, for example, from 0.5 mm to 5.0 mm. The sealant layer 10 has this degree of thickness, and accordingly, a flow of a sealant during travel can be suppressed while ensuring good sealing properties. Additionally, good processability at the time of attaching the sealant layer 10 to the tire inner surface is also obtained. When the thickness of the sealant layer 10 is less than 0.5 mm, it becomes difficult to ensure sufficient sealing properties. When the thickness of the sealant layer 10 exceeds 5.0 mm, tire weight increases and rolling resistance degrades. Note that thickness of sealant layer 10 refers to the average thickness.

The sealant layer 10 can be formed by attaching later the sealant layer 10 to the inner surface of the vulcanized pneumatic tire. For example, the sealant layer 10 can be formed by attaching a sealant material including the sealant material composition described below and molded in a sheet shape to the entire circumference of the tire inner surface, or by spirally attaching a sealant material including the sealant material composition described below and molded in a string-like shape or a band-like shape to the tire inner surface. Additionally, at this time, the sealant material composition is heated, and accordingly, variation in the performance of the sealant material composition can be suppressed. As heating conditions, temperature may be preferably from 140° C. to 180° C., and more preferably from 160° C. to 180° C., and heating time may be preferably from 5 minutes to 30 minutes, and more preferably from 10 minutes to 20 minutes. According to the method of manufacturing the pneumatic tire, the pneumatic tire that provides good sealing properties at the time of puncture and that is difficult to generate a flow of the sealant can be manufactured efficiently.

An embodiment of the present invention mainly relates to the sealant material composition used in the sealant layer 10 of the self-sealing type pneumatic tire described above, and thus the basic structure of the pneumatic tire and the structure of the sealant layer 10 are not limited to the examples described above.

The sealant material composition of an embodiment of the present invention has characteristics of a proportion A of toluene insoluble represented by Formula (1) below being from 30 mass % to 60 mass %, and preferably from 35 mass % to 50 mass %:

$$A = (W2/W1) \times 100 \quad (1)$$

(where W2 is mass (unit: g) of toluene insoluble remaining after immersion of the sealant material composition in toluene for one week, and W1 is initial mass (unit: g) obtained before immersion of the sealant material composition in toluene).

The sealant material composition having such characteristics can ensure good sealing properties while suppressing a flow of the sealant during travel, and can provide such performance in a well-balanced, compatible manner. Specifically, the proportion A of the toluene insoluble is from 30 mass % to 60 mass %, and accordingly, adequate crosslinking density can be achieved, and suitable physical properties (low fluidity and excellent sealing properties) as the sealant material can be ensured. When the proportion A of the toluene insoluble is less than 30 mass %, crosslinking density becomes low, and the effect of suppressing fluidity cannot be obtained sufficiently. When the proportion A of the toluene insoluble exceeds 60 mass %, crosslinking density becomes excessively high, and there is concern that sealing properties decrease. Particularly, when the proportion A of the toluene insoluble is from 35 mass % to 50 mass %, low fluidity and excellent sealing properties can be provided in a compatible manner to a high degree even under severe conditions, for example, at high speeds of 200 km/h or more and in low-temperature environments of approximately −20° C. Specifically, the proportion A of the toluene insoluble is 35 mass % or more, and accordingly, crosslinking density can be enhanced sufficiently, and thus, a flow of the sealant can be suppressed even at high speeds. On the other hand, the proportion A of the toluene insoluble is 50 mass % or less, and accordingly, crosslinking density can be reduced adequately, and thus, good sealing properties can be ensured even in low-temperature environments.

Further, in an embodiment of the present invention, as the sealant layer 10 (sealant material composition), a sealant layer including cavities such as air bubbles inside is preferably used. In other words, regarding specific gravity of the sealant material composition, assuming that specific gravity measured by an underwater replacement method is measured specific gravity $d1$, and specific gravity calculated from specific gravity and a blended amount of each raw material in the sealant material composition is calculated specific gravity $d2$, in an embodiment of the present invention, the sealant material composition in which the measured specific gravity $d1$ is smaller than the calculated specific gravity $d2$ may be used. Particularly, in the sealant material composition of an embodiment of the present invention, a ratio $d1/d2$ of the measured specific gravity $d1$ to the calculated specific gravity $d2$ may be from 0.7 to 0.9, preferably from 0.75 to 0.85.

In the sealant material composition that satisfies such a relationship of the specific gravity, cavities such as air bubbles are formed inside the sealant material (sealant layer 10) as described above, and a content of the cavities is in the adequate range, and thus good sealing properties and good fluidity can be ensured without impairing such performance. In addition, the content of the cavities is in the adequate range, and thus, accumulation of heat due to the sealant layer 10 can be suppressed. Additionally, as compared to a sealant material including no cavity, a weight increase can be suppressed even when a sealant layer having an identical volume is provided. Thus, good high-speed durability and good load durability can be ensured.

At this time, when the ratio $d1/d2$ is smaller than 0.7, the content of the cavities in the sealant layer becomes excessive, and good sealing properties cannot be maintained. When the ratio $d1/d2$ exceeds 0.9, the content of the cavities in the sealant layer is small, and thus, the effect of suppressing accumulation of heat cannot be expected sufficiently, and durability cannot improve. Note that the range of each of the measured specific gravity d1 and the calculated specific gravity d2 is not particularly limited, but the measured specific gravity d1 may be set to be, preferably from 0.7 to 0.9, and more preferably from 0.75 to 0.85. Additionally, the calculated specific gravity d2 may be set to be, preferably 1.0 or less, and more preferably from 0.8 to 0.9. The measured specific gravity d1 and the calculated specific gravity d2 are set in this manner, and accordingly, this is advantageous in that durability (particularly, high-speed durability) improves.

As long as the sealant material composition used in an embodiment of the present invention has the characteristics described above, a specific blend of the sealant material composition is not particularly limited. However, to reliably obtain the characteristics described above, for example, a blend described below is preferably employed.

In the sealant material composition of an embodiment of the present invention, a rubber component may include butyl rubber. A proportion of the butyl rubber occupying the rubber component is preferably 10 mass % or more, and more preferably from 20 mass % to 90 mass %. Good adhesiveness with respect to the tire inner surface can be ensured by including the butyl rubber in this manner. When the proportion of the butyl rubber is less than 10 mass %, adhesiveness with respect to the tire inner surface cannot be ensured sufficiently.

The sealant material composition of an embodiment of the present invention preferably includes, as the butyl rubber, halogenated butyl rubber. Examples of the halogenated butyl rubber include chlorinated butyl rubber and brominated butyl rubber, and particularly, chlorinated butyl rubber can be used suitably. In a case where chlorinated butyl rubber is used, a proportion of the chlorinated butyl rubber occupying 100 mass % of the rubber component is preferably 5 mass % or more, and more preferably from 10 mass % to 85 mass %. Reactivity of the rubber component and a crosslinking agent or an organic peroxide described below increases by including the halogenated butyl rubber (chlorinated butyl rubber), and this is advantageous in that ensuring of sealing properties and suppression of a flow of the sealant are provided in a compatible manner. Additionally, the processability of the sealant material composition can also improve. When the proportion of the chlorinated butyl rubber is less than 5 mass %, reactivity of the rubber component and the crosslinking agent or the organic peroxide described below does not improve sufficiently, and a desired effect cannot be obtained sufficiently.

In the sealant material composition of an embodiment of the present invention, not all the butyl rubber is required to be the halogenated butyl rubber (chlorinated butyl rubber), and non-halogenated butyl rubber can also be used in combination. Examples of the non-halogenated butyl rubber include unmodified butyl rubber normally used in a sealant material composition, such as BUTYL-065 available from JSR Corporation, and BUTYL-301 available from LANXESS AG. In a case where the halogenated butyl rubber and the non-halogenated butyl rubber are used in combination, a blended amount of the non-halogenated butyl rubber may be preferably less than 20 mass %, and more preferably less than 10 mass % per 100 mass % of the rubber component.

In the sealant material composition of an embodiment of the present invention, two or more types of rubber are preferably used in combination as the butyl rubber. That is, other type of halogenated butyl rubber (for example, brominated butyl rubber) or the non-halogenated butyl rubber is preferably used in combination with respect to the chlorinated butyl rubber. The three types of the chlorinated butyl rubber, other type of halogenated butyl rubber (brominated butyl rubber), and the non-halogenated butyl rubber mutually differ in a vulcanization rate, and thus, when at least the two types are used in combination, the physical properties (viscosity, elasticity, and the like) of the sealant material composition obtained after vulcanization do not become uniform due to a difference in the vulcanization rate. That is, due to a distribution (variation in concentration) of rubber differing in a vulcanization rate in the sealant material composition, a relatively hard portion and a relatively soft portion are mixed in the sealant layer obtained after vulcanization. As a result, this is advantageous in that fluidity is suppressed in the relatively hard portion and sealing properties are exhibited in the relatively soft portion, and thus such performance is provided in a well-balanced, compatible manner.

In the sealant material composition of an embodiment of the present invention, other diene rubber than the butyl rubber can also be blended as the rubber component. As other diene rubber, rubber that is generally used in a sealant material composition, such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR) can be used. Other diene rubber may be used alone or as a discretionary blend.

In the sealant material composition of an embodiment of the present invention, a crosslinking agent is preferably blended. Note that "crosslinking agent" in an embodiment of the present invention refers to a crosslinking agent excluding an organic peroxide, and examples of the crosslinking agent include sulfur, flowers of zinc, cyclic sulfide, a resin (resin vulcanization), and amine (amine vulcanization). As the crosslinking agent, a crosslinking agent including a sulfur component (for example, sulfur) is preferably used. The crosslinking agent is blended in this manner, and accordingly, adequate crosslinking for providing ensuring of sealing properties and prevention of a flow of the sealant in a compatible manner can be realized. A blended amount of the crosslinking agent is preferably from 0.1 parts by mass to 40 parts by mass, and more preferably from 0.5 parts by mass to 20 parts by mass per 100 parts by mass of the rubber component described above. When the blended amount of the crosslinking agent is less than 0.1 parts by mass, the blended amount of the crosslinking agent is identical to a blended amount in the case of including substantially no crosslinking agent, and appropriate crosslinking cannot be performed. When the blended amount of the crosslinking agent exceeds 40 parts by mass, crosslinking of the sealant material composition excessively proceeds, and sealing properties decrease.

In the sealant material composition of an embodiment of the present invention, the crosslinking agent described above is not used alone, but is preferably used in combination with an organic peroxide. The crosslinking agent and the organic peroxide are used in combination and are blended in this manner, and accordingly, adequate crosslinking for providing ensuring of sealing properties and prevention of a flow of the sealant in a compatible manner can be realized. Particularly, the organic peroxide generates carbon dioxide gas during vulcanization, and accordingly, air bubbles (cavities) are formed in the sealant material, and thus, blending of the organic peroxide is effective for setting the specific gravity to be in the range described above and for improving durability. A blended amount of the organic peroxide is preferably from 1 part by mass to 40 parts by mass, and more preferably from 1.0 part by mass to 20 parts by mass per 100 parts by mass of the rubber component described above. When the blended amount of the organic peroxide is less than 1 part by mass, the blended amount of the organic peroxide is excessively small, and crosslinking cannot be performed sufficiently, and desired physical properties cannot be obtained. Additionally, foaming due to the organic peroxide cannot be expected sufficiently. When the blended amount of the organic peroxide exceeds 40 parts by mass, crosslinking of the sealant material composition excessively proceeds, and sealing properties decrease. Additionally, foaming due to the organic peroxide becomes excessive, and there is concern that processability decreases.

When the crosslinking agent and the organic peroxide are used in combination in this manner, a mass ratio A/B of a blended amount A of the crosslinking agent to a blended amount B of the organic peroxide may be preferably from 5/1 to 1/200, and more preferably from 1/10 to 1/20. According to such a blending proportion, ensuring of sealing properties and prevention of a flow of the sealant can be provided in a better-balanced, compatible manner.

Examples of the organic peroxide include dicumyl peroxide, t-butyl cumyl peroxide, benzoyl peroxide, dibenzoyl peroxide, butyl hydroperoxide, p-chlorobenzoyl peroxide, and 1,1,3,3-tetramethylbutyl hydroperoxide. Particularly, an organic peroxide having a one-minute half-life temperature of from 100° C. to 200° C. is preferable, and among the specific examples described above, dicumyl peroxide and t-butyl cumyl peroxide are particularly preferable. Note that in an embodiment of the present invention, as "one-minute half-life temperature," generally, a value described in the "Organic Peroxide Catalog No. 10 Ed." from Nippon Oil & Fats Co., Ltd. is employed, and in a case where a value is not described, a value determined from thermal decomposition in an organic solvent by a method identical to a method described in the catalog is employed.

In the sealant material composition of an embodiment of the present invention, a crosslinking aid is preferably blended. Crosslinking aid refers to a compound that acts as a crosslinking reaction catalyst by blending the compound with the crosslinking agent including the sulfur component. The crosslinking agent and the crosslinking aid are blended, and accordingly, a vulcanization rate can be increased, and the productivity of the sealant material composition can be enhanced. A blended amount of the crosslinking aid is preferably more than 0 parts by mass and less than 1 part by mass, and more preferably from 0.1 parts by mass to 0.9 parts by mass per 100 parts by mass of the rubber component described above. The blended amount of the crosslinking aid is reduced in this manner, and accordingly, degradation (heat degradation) of the sealant material composition can be suppressed while promoting crosslinking reaction as a catalyst. When the blended amount of the crosslinking aid is 1 part by mass or more, the effect of suppressing heat degradation cannot be obtained sufficiently. Note that crosslinking aid is a crosslinking aid that acts as a crosslinking reaction catalyst by blending the crosslinking aid with the crosslinking agent including the sulfur component as described above, and thus, when the crosslinking aid coexists with an organic peroxide instead of the sulfur component, the effect as a crosslinking reaction catalyst cannot be obtained, and a large content of the crosslinking aid needs to be used, and heat degradation is promoted.

The blended amount of the crosslinking agent may be preferably from 50 mass % to 400 mass %, and more preferably from 100 mass % to 200 mass % of the blended amount of the crosslinking aid described above. The crosslinking agent and the crosslinking aid are blended in this manner and in a well-balanced manner, and accordingly, a good function of the crosslinking aid as a catalyst can be exhibited, and this is advantageous in that ensuring of sealing properties and prevention of a flow of the sealant are provided in a compatible manner. When the blended amount of the crosslinking agent is less than 50 mass % of the blended amount of the crosslinking aid, fluidity decreases. When the blended amount of the crosslinking agent exceeds 400 mass % of the blended amount of the crosslinking aid, deterioration resistance performance decreases.

Examples of the crosslinking aid include sulfenamide-based, thiazole-based, thiuram-based, thiourea-based, guanidine-based, dithiocarbamate-based, aldehyde-amine-based, aldehyde-ammonia-based, imidazoline-based, and xanthogen-based compounds (vulcanization accelerators). Among these, thiazole-based, thiuram-based, guanidine-based, and dithiocarbamate-based vulcanization accelerators can be used suitably. Examples of the thiazole-based vulcanization accelerator include 2-mercaptobenzothiazole, and dibenzothiazyl disulfide. Examples of the thiuram-based vulcanization accelerator include tetramethylthiuram monosulfide, and tetramethylthiuram disulfide. Examples of the guanidine-based vulcanization accelerator include diphenylguanidine, and di-ortho-tolylguanidine. Examples of the dithiocarbamate-based vulcanization accelerator include sodium dimethyldithiocarbamate, and sodium diethyldithiocarbamate. Particularly, in an embodiment of the present invention, thiazole-based or thiuram-based vulcanization accelerators are preferably used, and variation in the performance of the sealant material composition obtained can be suppressed.

Note that, for example, a compound such as quinone dioxime that actually functions as the crosslinking agent may be referred to as the crosslinking aid for the sake of convenience, but crosslinking aid in an embodiment of the present invention is a compound functioning as a catalyst of crosslinking reaction using the crosslinking agent as described above, and thus, the quinone dioxime does not correspond to the crosslinking aid in an embodiment of the present invention.

The sealant material composition of an embodiment of the present invention is preferably blended with a liquid polymer. The liquid polymer is blended in this manner, and accordingly, the viscosity of the sealant material composition can be enhanced, and sealing properties can improve. A blended amount of the liquid polymer is preferably from 50 parts by mass to 400 parts by mass, and more preferably from 70 parts by mass to 200 parts by mass per 100 parts by mass of the rubber component described above. When the blended amount of the liquid polymer is less than 50 parts by mass, the effect of enhancing the viscosity of the sealant material composition cannot be obtained sufficiently. When the blended amount of the liquid polymer exceeds 400 parts by mass, a flow of the sealant cannot be prevented sufficiently.

The liquid polymer is preferably co-crosslinkable with the rubber component (butyl rubber) in the sealant material composition, and examples of the liquid polymer include paraffin oil, polybutene oil, polyisoprene oil, polybutadiene oil, polyisobutene oil, aroma oil, and polypropylene glycol. From the perspective of reducing the temperature dependency of the physical properties of the sealant material composition and ensuring good sealing properties in low-temperature environments, among these, paraffin oil, polybutene oil, polyisoprene oil, polybutadiene oil, aroma oil, and polypropylene glycol are preferable, and particularly, paraffin oil is preferably used. Paraffin oil is used, and accordingly, this is advantageous in that viscosity at each of the temperatures described above is set to be in each of the appropriate ranges. Additionally, molecular weight of the liquid polymer is preferably 800 or more, more preferably 1000 or more, and even more preferably 1200 or more and 3000 or less. The liquid polymer having large molecular weight is used in this manner, and accordingly, a shift of an oil component from the sealant layer provided in the tire inner surface to a tire main body to affect the tire can be prevented.

The sealant material composition including the blend described above contains at least the butyl rubber, and accordingly, the sealant material composition adequately imparts high viscosity to the rubber component, and at the same time, crosslinking is performed by using an adequate content of the crosslinking agent (preferably used in combination with the organic peroxide), and accordingly, adequate elasticity that does not cause a flow during travel is obtained while ensuring viscosity sufficient to obtain good sealing properties, and such performance can be provided in a well-balanced, compatible manner. Thus, the sealant material composition can be used suitably in the sealant layer 10 (sealant material) of the self-sealing type pneumatic tire, and the sealant material composition can ensure good sealing properties while suppressing a flow of the sealant during travel, and can provide such performance in a well-balanced, compatible manner.

An embodiment of the present invention will further be described below by way of Examples, but the scope of an embodiment of the present invention is not limited to Examples.

EXAMPLES

Tires according to Comparative Examples 1 to 9 and according to Examples 1 to 8 were manufactured. The tires have a tire size of 255/40R20, include the basic structure illustrated in drawing FIGURE, and include a sealant layer including a sealant on an inner side in a tire radial direction of an innerliner layer in a tread portion. The tires are set for a blend and physical properties of a sealant material composition constituting the sealant layer as indicated in Tables 1 and 2.

Additionally, tires according to Comparative Examples 11 to 18 and according to Examples 11 to 16 were manufactured. The tires have a tire size of 255/40R20, include the basic structure illustrated in drawing FIGURE, and include a sealant layer including a sealant on an inner side in a tire radial direction of an innerliner layer in a tread portion. The tires are set for a blend and physical properties of a sealant material composition constituting the sealant layer as indicated in Tables 3 and 4.

Note that in Tables 1 to 4, a proportion A (mass %) of toluene insoluble is calculated by Formula (1) below by using mass W2 (unit: g) of toluene insoluble remaining after immersion of the sealant material composition in toluene for one week and initial mass W1 (unit: g) obtained before immersion of the sealant material composition in toluene.

$$A=(W2/W1)\times 100 \quad (1)$$

Note that in Tables 3 and 4, measured specific gravity d1 is measured by an underwater replacement method in accordance with JIS Z8807 "Method of measuring density and specific gravity of solid."

The test tires (sealant materials) in the examples indicated in Tables 1 and 2 are evaluated for sealing properties in a room temperature environment, sealing properties in low-temperature environments, and fluidity during travel, and the results are also indicated in Tables 1 and 2. Additionally, the examples indicated in Tables 3 and 4 are further evaluated for load durability and high-speed durability, in addition to sealing properties in a room temperature environment, sealing properties in low-temperature environments, and fluidity during travel that are common to Tables 1 and 2, and the results are also indicated in Tables 3 and 4. Each of the evaluation items is evaluated based on the following test methods.

Sealing Properties in Room Temperature Environment

The test tires were mounted on wheels having a rim size of 20×9 J, and were mounted on a test vehicle, and at an initial air pressure of 250 kPa, a load of 8.5 kN, and a temperature of 23° C., a nail having a diameter of 4.0 mm was inserted into the tread portion, and further, an air pressure of each of the tires left to stand for one hour in a state where the nail was removed was measured. The evaluation results are indicated by the following five levels. Note that when scores of the evaluation results are "4" or more, this means that sufficient sealing properties are exhibited, and that as the scores are larger, more excellent sealing properties are exhibited.

5: Air pressure obtained after the standing is 240 kPa or more and 250 kPa or less 4: Air pressure obtained after the standing is 230 kPa or more and less than 240 kPa 3: Air pressure obtained after the standing is 215 kPa or more and less than 230 kPa 2: Air pressure obtained after the standing is 200 kPa or more and less than 215 kPa 1: Air pressure obtained after the standing is less than 200 kPa Sealing Properties in Low-Temperature Environments After the test tires were cooled at a temperature of −20° C. for 24 hours, the test tires were mounted on wheels having a rim size of 20×9 J, and were mounted on a test vehicle, and at an initial air pressure of 250 kPa, a load of 8.5 kN, and a temperature of −20° C., a nail having a diameter of 4.0 mm was inserted into the tread portion, and further, an air pressure of each of the test tires left to stand for one hour in a −20° C. environment in a state where the nail was removed was measured. The evaluation results are indicated by the following five levels. Note that when scores of the evaluation results are "3" or more, this means that sufficient sealing properties are exhibited, and that as the scores are larger, more excellent sealing properties are exhibited.

5: Air pressure obtained after the standing is 240 kPa or more and 250 kPa or less 4: Air pressure obtained after the standing is 230 kPa or more and less than 240 kPa 3: Air pressure obtained after the standing is 215 kPa or more and less than 230 kPa 2: Air pressure obtained after the standing is 200 kPa or more and less than 215 kPa 1: Air pressure obtained after the standing is less than 200 kPa Fluidity of Sealant The test tires were mounted on wheels having a rim size of 20×9 J, and mounted on a drum testing machine, and at an air pressure of 220 kPa, a load of 8.5 kN, and two levels of travel speeds of 100 km/h and 200 km/h, travel for one hour at each speed was performed, and a flow state of the sealant after the travel at each speed was examined. In the evaluation results, lines of 20×40 squares each having a grid width of 5 mm are ruled in a surface of the sealant layer before the travel, and the number of the squares having a distorted shape after the travel is counted, and then, the case where no flow of the sealant is observed (the number of the distorted squares is 0) is indicated as "Good," the case where the number of the distorted squares is less than ¼ of the total number of the squares is indicated as "Pass," and the case where the number of the distorted squares is ¼ or more of the total number of the squares is indicated as "Fail."

Load Durability

The test tires were mounted on wheels having a rim size of 20×9 J, and mounted on a drum testing machine, and at an air pressure of 250 kPa, an initial load of 8.5 kN, and a travel speed of 80 km/h, a load was added by 10% per hour (until 250% at the maximum), and the travel distance until generation of tire failure was measured. The evaluation results are indicated by the following five levels. Note that when scores of the evaluation results are "3" or more, this means that sufficient load durability is exhibited, and that as the scores are larger, more excellent load durability is exhibited.

5: Travel distance is 1200 km or more
4: Travel distance is 1040 km or more and less than 1200 km
3: Travel distance is 880 km or more and less than 1040 km
2: Travel distance is 640 km or more and less than 880 km
1: Travel distance is less than 640 km High-Speed Durability The test tires were mounted on wheels having a rim size of 20×9 J, and mounted on a drum testing machine, and at an air pressure of 250 kPa and a load of 8.5 kN, after travel was first performed at a speed of 200 km/h for one hour, travel was further performed at a speed of 220 km/h for one hour, and subsequently, the speed was increased by 20 km/h per hour-travel, and the travel distance until generation of tire failure was measured. The evaluation results are indicated by the following five levels. Note that when scores of the evaluation results are "2" or more, this means that sufficient high-speed durability is exhibited, and that as the scores are larger, more excellent high-speed durability is exhibited.

5: Travel distance is 2160 km or more
4: Travel distance is 1500 km or more and less than 2160 km
3: Travel distance is 920 km or more and less than 1500 km
2: Travel distance is 660 km or more and less than 920 km
1: Travel distance is less than 660 km

TABLE 1

| | | | Example 1 | Example 2 | Comparative Example 1 | Comparative Example 2 | Example 3 | Comparative Example 3 | Example 4 | Comparative Example 4 | Comparative Example 5 |
|---|---|---|---|---|---|---|---|---|---|---|---|
| Blend | Butyl rubber 1 | Parts by mass | 90 | 90 | 90 | 90 | 90 | 90 | 90 | 90 | 90 |
| | Butyl rubber 2 | Parts by mass | | | | | | | | | |
| | Natural rubber | Parts by mass | 10 | 10 | 10 | 10 | 10 | 10 | 10 | 10 | 10 |
| | Carbon black | Parts by mass | 30 | 30 | 30 | 30 | 30 | 30 | 30 | 30 | 30 |
| | Crosslinking agent 1 | Parts by mass | 1 | 1 | | 0.05 | 1 | | 1 | 1 | 1 |
| | Crosslinking agent 2 | Parts by mass | | | | | | 1 | | | |
| | Crosslinking aid 1 | Parts by mass | 0.5 | 0.5 | 0.5 | 0.5 | 0.5 | 0.5 | 0.5 | 0.5 | 0.5 |
| | Crosslinking aid 2 | Parts by mass | | | | | | | | | |
| | Crosslinking aid 3 | Parts by mass | | | | | | | | | |
| | Organic peroxide 1 | Parts by mass | 20 | 40 | 40 | 40 | 40 | 40 | 40 | | |
| | Organic peroxide 2 | Parts by mass | | | | | | | | | |
| | Liquid polymer | Parts by mass | 200 | 200 | 200 | 200 | 100 | 100 | 50 | 50 | 30 |
| Vulcanization condition | Vulcanization temperature | ° C. | 180 | 180 | 180 | 180 | 180 | 180 | 180 | 180 | 180 |
| | Vulcanization time | min. | 10 | 10 | 10 | 10 | 10 | 10 | 10 | 10 | 10 |
| Physical properties | Proportion A of toluene insoluble | Mass % | 30 | 35 | 10 | 25 | 50 | 65 | 60 | 65 | 75 |
| Evaluation results | Sealing properties (23° C.) | | 5 | 5 | 5 | 5 | 5 | 3 | 4 | 3 | 1 |
| | Sealing properties (−20° C.) | | 5 | 5 | 5 | 5 | 4 | 1 | 3 | 1 | 1 |
| | Fluidity (100 km/h) | | Good | Good | Fail | Pass | Good | Good | Good | Good | Good |
| | Fluidity (200 km/h) | | Pass | Good | Fail | Fail | Good | Good | Good | Good | Good |

TABLE 2

| | | | Example 5 | Comparative Example 6 | Comparative Example 7 | Comparative Example 8 | Example 6 | Comparative Example 9 | Example 7 | Example 8 |
|---|---|---|---|---|---|---|---|---|---|---|
| Blend | Butyl rubber 1 | Parts by mass | 90 | 90 | 90 | 90 | 90 | 90 | 90 | |
| | Butyl rubber 2 | Parts by mass | | | | | | | | 90 |
| | Natural rubber | Parts by mass | 10 | 10 | 10 | 10 | 10 | 10 | 10 | 10 |
| | Carbon black | Parts by mass | 30 | 30 | 30 | 30 | 30 | 30 | 30 | 30 |
| | Crosslinking agent 1 | Parts by mass | 1 | 1 | 1 | 1 | 1 | 1 | 1 | 1 |
| | Crosslinking agent 2 | Parts by mass | | | | | | | | |
| | Crosslinking aid 1 | Parts by mass | | | | | 0.5 | 0.5 | 0.5 | 0.5 |
| | Crosslinking aid 2 | Parts by mass | 0.5 | | | | | | | |
| | Crosslinking aid 3 | Parts by mass | | 0.5 | 0.5 | | 0.5 | | | |
| | Organic peroxide 1 | Parts by mass | 40 | 40 | | | | 40 | | 40 |
| | Organic peroxide 2 | Parts by mass | | | 40 | 40 | 40 | | 40 | |
| | Liquid polymer | Parts by mass | 200 | 200 | 200 | 200 | 100 | 100 | 100 | 200 |
| Vulcanization condition | Vulcanization temperature | °C. | 180 | 180 | 180 | 180 | 180 | 160 | 160 | 180 |
| | Vulcanization time | min. | 10 | 10 | 10 | 10 | 10 | 30 | 30 | 10 |
| Physical properties | Proportion A of toluene insoluble | Mass % | 31 | 28 | 20 | 65 | 50 | 65 | 55 | 35 |
| Evaluation results | Sealing properties (23° C.) | | 5 | 5 | 5 | 3 | 5 | 3 | 5 | 4 |
| | Sealing properties (−20° C.) | | 5 | 5 | 5 | 1 | 5 | 1 | 4 | 3 |
| | Fluidity (100 km/h) | | Good | Pass | Fail | Good | Good | Good | Good | Good |
| | Fluidity (200 km/h) | | Pass | Fail | Fail | Good | Good | Good | Good | Good |

TABLE 3

| | | | Example 11 | Example 12 | Example 13 | Example 14 | Example 15 | Comparative Example 11 |
|---|---|---|---|---|---|---|---|---|
| Blend | Butyl rubber 1 | Parts by mass | 90 | 90 | 90 | 90 | 90 | 90 |
| | Natural rubber | Parts by mass | 10 | 10 | 10 | 10 | 10 | 10 |
| | Crosslinking agent 1 | Parts by mass | 1 | 1 | 1 | 10 | 1 | 0.5 |
| | Crosslinking agent 2 | Parts by mass | | | | | | |
| | Crosslinking aid 1 | Parts by mass | 0.5 | 0.5 | 0.5 | 0.5 | 0.5 | 0.5 |
| | Organic peroxide 3 | Parts by mass | 20 | 30 | 40 | 20 | 1 | 80 |
| | Organic peroxide 4 | Parts by mass | | | | | | |
| | Liquid polymer | Parts by mass | 200 | 150 | 50 | 200 | 200 | 100 |
| Physical properties | Proportion A of toluene insoluble | Mass % | 30 | 40 | 60 | 40 | 40 | 10 |
| Specific gravity | Measured specific gravity d1 | | 0.80 | 0.74 | 0.85 | 0.93 | 0.88 | 0.50 |
| | Calculated specific gravity d2 | | 0.90 | 0.95 | 1.05 | 1.10 | 0.90 | 1.00 |
| | Ratio d1/d2 | | 0.89 | 0.78 | 0.81 | 0.85 | 0.98 | 0.50 |
| Evaluation results | Sealing properties (23° C.) | | 5 | 4 | 5 | 5 | 5 | 1 |
| | Sealing properties (−20° C.) | | 5 | 4 | 4 | 5 | 5 | 1 |
| | Fluidity (100 km/h) | | Good | Good | Pass | Good | Good | Fail |
| | Fluidity (200 km/h) | | Pass | Good | Pass | Good | Good | Fail |
| | Load durability | | 3 | 5 | 5 | 4 | 1 | 5 |
| | High-speed durability | | 3 | 3 | 2 | 2 | 1 | 5 |

TABLE 4

| | | | Example 16 | Example 17 | Example 18 | Example 19 | Example 20 | Comparative Example 12 |
|---|---|---|---|---|---|---|---|---|
| Blend | Butyl rubber 1 | Parts by mass | 90 | 90 | 90 | 90 | 90 | 90 |
| | Natural rubber | Parts by mass | 10 | 10 | 10 | 10 | 10 | 10 |
| | Crosslinking agent 1 | Parts by mass | | | 1 | 1 | 1 | |
| | Crosslinking agent 2 | Parts by mass | 1 | 40 | | | | 1 |
| | Crosslinking aid 1 | Parts by mass | 0.5 | 0.5 | 0.5 | 0.5 | 0.5 | 0.5 |
| | Organic peroxide 3 | Parts by mass | 20 | 20 | | | | |
| | Organic peroxide 4 | Parts by mass | | | 20 | 40 | 40 | |
| | Liquid polymer | Parts by mass | 50 | 200 | 200 | 200 | 100 | 100 |
| Physical properties | Proportion A of toluene insoluble | Mass % | 60 | 60 | 40 | 30 | 40 | 70 |
| Specific gravity | Measured specific gravity d1 | | 0.85 | 0.95 | 0.74 | 0.68 | 0.72 | 1.03 |
| | Calculated specific gravity d2 | | 0.90 | 1.04 | 0.95 | 0.95 | 1.00 | 1.05 |
| | Ratio d1/d2 | | 0.94 | 0.91 | 0.78 | 0.72 | 0.72 | 0.98 |

TABLE 4-continued

|  |  | Example 16 | Example 17 | Example 18 | Example 19 | Example 20 | Comparative Example 12 |
|---|---|---|---|---|---|---|---|
| Evaluation Results | Sealing properties (23° C.) | 5 | 5 | 5 | 4 | 5 | 3 |
|  | Sealing properties (−20° C.) | 5 | 5 | 5 | 3 | 3 | 2 |
|  | Fluidity (100 km/h) | Good | Good | Good | Good | Good | Good |
|  | Fluidity (200 km/h) | Good | Good | Good | Pass | Good | Good |
|  | Load durability | 1 | 2 | 5 | 5 | 5 | 1 |
|  | High-speed durability | 1 | 1 | 5 | 5 | 4 | 1 |

Types of raw materials used in Tables 1 to 4 will be described below.

Butyl rubber 1: Chlorinated butyl rubber, CHLOROBUTYL1066 available from JSR Corporation (specific gravity: 0.92)

Butyl rubber 2: Brominated butyl rubber, BROMOBUTYL2222 available from JSR Corporation (specific gravity: 0.93)

Natural rubber: Natural rubber available from SRI TRANG (specific gravity: 0.96)

Carbon black: SEAST KH available from Tokai Carbon Co., Ltd.

Crosslinking agent 1: Sulfur, small lumps of sulfur available from Hosoi Chemical Industry Co., Ltd. (specific gravity: 1.92)

Crosslinking agent 2: Quinone dioxime, VULNOC GM available from Ouchi Shinko Chemical Industrial Co., Ltd. (specific gravity: 0.92)

Crosslinking aid 1: Thiuram-based vulcanization accelerator, NOCCELER TT-P available from Ouchi Shinko Chemical Industrial Co., Ltd. (specific gravity: 1.45)

Crosslinking aid 2: Thiuram-based vulcanization accelerator, NOCCELER DM-PO available from Ouchi Shinko Chemical Industrial Co., Ltd.

Crosslinking aid 3: Thiuram-based vulcanization accelerator, NOCCELER TMU available from Ouchi Shinko Chemical Industrial Co., Ltd.

Organic peroxide 1: Di-(2-t-butyl peroxyl)isopropylbenzene, PERBUTYL P-40 available from NOF Corporation Organic peroxide 2: Dibenzoyl peroxide, NYPER NS available from NOF Corporation (one-minute half-life temperature: 133° C.)

Organic peroxide 3: PERHEXA 25B available from NOF Corporation (one-minute half-life temperature: 178° C., specific gravity: 0.88)

Organic peroxide 4: PERHEXA C40 available from NOF Corporation (one-minute half-life temperature: 154° C., specific gravity: 0.94)

Liquid polymer: Paraffin oil, HICALL K-350 available from Kaneda Co. Ltd. (molecular weight: 850, specific gravity: 0.88)

As can be seen from Tables 1 and 2, the pneumatic tires according to Examples 1 to 8 exhibit excellent sealing properties in both a room temperature environment and low-temperature environments and suppress a flow of the sealant during travel regardless of travel speed, and provide such performance in a well-balanced, compatible manner. On the other hand, in Comparative Examples 1 and 2 and Comparative Examples 6 and 7, the proportion A of the toluene insoluble is small, and thus, a flow of the sealant during travel cannot be suppressed. In Comparative Examples 3 to 5 and Comparative Examples 8 and 9, the proportion A of the toluene insoluble is large, and thus, sufficient sealing properties cannot be exhibited.

As can be seen from Tables 3 and 4, the pneumatic tires of Examples 11 to 20 exhibit excellent sealing properties both in a room temperature environment and in low-temperature environments and suppress a flow of the sealant during travel regardless of travel speed. Further, in Examples 11 to 14 and 18 to 20 where the ratio d1/d2 satisfies the range of from 0.7 to 0.9, good load durability and good high-speed durability are exhibited in addition to the performance described above, and such performance is provided in a well-balanced, compatible manner. On the other hand, in Comparative Example 11, the proportion A of the toluene insoluble is small, and thus, a flow of the sealant during travel cannot be suppressed. Additionally, in Comparative Example 12, the proportion A of the toluene insoluble is large, and thus, sufficient sealing properties cannot be exhibited.

REFERENCE SIGNS LIST

1 Tread portion
2 Sidewall portion
3 Bead portion
4 Carcass layer
5 Bead core
6 Bead filler
7 Belt layer
8 Belt reinforcing layer
9 Innerliner layer
10 Sealant layer
CL Tire equator

The invention claimed is:

1. A pneumatic tire comprising a sealant material composition constituting a sealant layer disposed in an inner surface of the pneumatic tire, a proportion A of toluene insoluble occupying the sealant material composition represented by Formula (1) being from 30 mass % to 60 mass %:

$$A = (W2/W1) \times 100 \tag{1}$$

(where W2 is mass (unit: g) of toluene insoluble remaining after immersion of the sealant material composition in toluene for one week, and W1 is initial mass (unit: g) obtained before immersion of the sealant material composition in toluene), the sealant layer includes one or more cavities formed therein, wherein from 0.1 parts by mass to 40 parts by mass of a crosslinking agent is blended per 100 parts by mass of a rubber component;

wherein from 1 part by mass to 40 parts by mass of an organic peroxide and more than 0 parts by mass and less than 1 part by mass of a crosslinking aid are blended per 100 parts by mass of the rubber component;

wherein from 70 parts by mass to 400 parts by mass of a liquid polymer is blended per 100 parts by mass of the rubber component; and wherein the liquid polymer is paraffin oil.

2. The pneumatic tire according to claim 1, wherein the proportion A of the toluene insoluble occupying the sealant material composition is from 35 mass % to 50 mass %.

3. The pneumatic tire according to claim 1, wherein assuming that specific gravity of the sealant material composition measured by an underwater replacement method is measured specific gravity d1, and specific gravity of the sealant material composition calculated from specific gravity and a blended amount of each raw material in the sealant material composition is calculated specific gravity d2, a ratio d1/d2 of the measured specific gravity d1 to the calculated specific gravity d2 is from 0.7 to 0.9.

4. The pneumatic tire according to claim 3, wherein the calculated specific gravity d2 is 1.0 or less.

5. The pneumatic tire according to claim 1, wherein the crosslinking agent comprises a sulfur component.

6. The pneumatic tire according to claim 1, wherein the rubber component comprises butyl rubber, and a blended amount of the butyl rubber per 100 mass % of the rubber component is 10 mass % or more.

7. The pneumatic tire according to claim 6, wherein the butyl rubber comprises chlorinated butyl rubber, and a blended amount of the chlorinated butyl rubber per 100 mass % of the rubber component is 5 mass % or more.

8. The pneumatic tire according to claim 1, wherein molecular weight of the paraffin oil is 800 or more.

* * * * *